United States Patent [19]
Meilhon

[11] Patent Number: 5,556,674
[45] Date of Patent: * Sep. 17, 1996

[54] READY-TEAR PACKAGING

[75] Inventor: Daniel Meilhon, Sort-en-Chalosse, France

[73] Assignee: Sodap, Dax-Cedex, France

[*] Notice: The portion of the term of this patent subsequent to Oct. 18, 2011, has been disclaimed.

[21] Appl. No.: 958,735

[22] Filed: Oct. 9, 1992

[30] Foreign Application Priority Data

Oct. 11, 1991 [FR] France .................................. 91 12555

[51] Int. Cl.$^6$ ........................... B65B 53/02; B65D 65/26
[52] U.S. Cl. ........................ 428/34.9; 428/35.2; 428/43; 428/136; 428/21 J; 428/516; 428/518; 428/520; 428/910; 428/913; 206/497; 383/116; 383/201; 383/908
[58] Field of Search ..................... 428/516, 518, 428/520, 35.2, 913, 910, 34.9, 43, 136, 215; 383/201, 207, 209, 116, 908; 206/497

[56] References Cited

U.S. PATENT DOCUMENTS

| | | | |
|---|---|---|---|
| 3,344,975 | 10/1967 | Stoker | 229/87.05 |
| 4,469,742 | 9/1984 | Oberle et al. | 428/516 |
| 4,532,189 | 7/1985 | Mueller | 428/518 |
| 4,762,748 | 8/1988 | Oberle | 428/516 |
| 4,818,588 | 4/1989 | Okabe et al. | 428/520 |
| 4,834,245 | 5/1989 | Ohga et al. | 383/201 |
| 4,865,902 | 9/1989 | Golike et al. | 428/516 |
| 5,041,316 | 8/1991 | Parnell et al. | 428/516 |

FOREIGN PATENT DOCUMENTS

| | | |
|---|---|---|
| 0206826 | 12/1986 | European Pat. Off. |
| 372886 | 6/1990 | European Pat. Off. |
| 285171 | 3/1990 | Japan |
| 732032 | 6/1955 | United Kingdom |

OTHER PUBLICATIONS

Patent Abstracts of Japan, M-986, 18-06-90 & JP-A-2085171 (Asahi Kasei Porifuretsukusu KK) 26-03-90.

*Primary Examiner*—Ellis Robinson
*Assistant Examiner*—Rena L. Dye
*Attorney, Agent, or Firm*—Burns, Doane, Swecker & Mathis, L.L.P.

[57] ABSTRACT

Heat-shrinkable coextrudate thermoplastic film packaging materials, well suited for the packaging of any one or more of a wide variety of articles, e.g., canned goods, and readily torn in a transverse direction substantially perpendicular to the machine direction thereof, e.g., by the provision of a tab or pull member thereon, are shaped from (a) at least one layer of a polyolefin; and
(b) at least one layer of a copolymer selected from among ionic copolymers of:
 (1) α-olefins of the formula R—CH=CH$_2$ wherein R is hydrogen or an alkyl radical having from 1 to 8 carbon atoms, with
 (2) α, β-ethylenically unsaturated carboxylic acids having from 3 to 8 carbon atoms, and
 (3) optionally, an additional monoethylenically unsaturated comonomer; with the proviso that from 10% to 90% of the carboxylic acid functions of such copolymer are ionized by neutralization by means of metallic ions distributed over the copolymer.

16 Claims, 1 Drawing Sheet

READY-TEAR PACKAGING

CROSS-REFERENCE TO COMPANION APPLICATION

Copending application Serial No. 07/958,705 [Attorney Docket No. 004895-007], filed concurrently herewith.

BACKGROUND OF THE INVENTION

1. Field of the Invention

The present invention relates to a ready-tear packaging, namely, a packaging material that can be readily or easily torn for the purpose of opening it, the packaging being particularly intended for use in bundling unit packs of individual articles to be packaged, such as items of canned food, cans, bottles or the like.

2. Description of the Prior Art

For the packaging and storage of a plurality of articles of a widely varying nature, thermoplastic plastic films have long been replacing the conventionally-used cardboard boxes for bundling a plurality of identical or different articles to form a unitary pack. It is thus common to, for example, find packs of very many different types of articles on the market, such as canned food, bottles, or cans, in a packaging consisting only of shrinkable plastic films.

Such unitary packs are produced in a known manner by bundling. Bundling is a technique which entails surrounding or enveloping all of the articles to be packaged with a shrinkable thermoplastic resin film which can be welded or secured back onto itself such as to provide a sleeve around the grouped articles, the package then being shrunk by, for example, transporting the entire assembly through an oven at a temperature that causes the thermoplastic resin constituting the film to soften, thus relieving internal stresses. Upon exiting the oven, rapid cooling ensures that the film shrinks tightly around the articles contained therein. Thus, a singularly homogeneous bundle or unitary pack is produced, in which the thermoplastic film functions as a skin in tight contact with the surfaces of the packaged articles.

All thermoplastic polymers or copolymers, in the form of shrinkable films, having a sufficient tear resistance can be employed for this type of application. Nevertheless, the polyolefins and, more particularly, polyethylene or polypropylene, or even copolymers of ethylene and propylene and an olefinically unsaturated monomer such as vinyl acetate, are those that are most frequently used industrially.

The ability to shrink and the tear resistance properties required of such thermoplastic films present, in the case of known films, certain disadvantages when the packaged articles are being unpacked. In particular, it is necessary, in light of the fact that the film is difficult to tear, to exert a quite significant force in order to stretch the packaging film to provide a path for removing the articles contained in the pack. If a tear is indeed initiated, the tear is quite random and cannot be controlled, often resulting in the articles falling from the package, as the tearing is in the direction of extrusion of the film. This latter property is of no interest or value whatsoever. In practice, shrinkable thermoplastic films employed for this packaging application are produced by extrusion, followed by winding onto a large roll. When the film is used, the articles are packaged in the direction of the length of the film as it progressively unwinds from the roll. Under these conditions, the tear properties of the film in the direction of extrusion, in other words along the length of the film, do not in any way facilitate the subsequent complete opening of the package. It may even be required to employ a cutting tool, which is dangerous, particularly in the home, with the accompanying risk of damaging or destroying the packaged articles.

In order to facilitate opening, thread-like strips incorporated directly into the film constituting the packaging have been used. Such strips are effective for opening small packages, but they are not suitable for opening large packages such as bundled unitary packs. Different means for initiating tearing have also been proposed to this art, but without success as actual tearing is still difficult and proceeds in a random fashion.

SUMMARY OF THE INVENTION

Accordingly, a major object of the present invention is the provision of improved ready-tear shrinkable thermoplastic films that simultaneously provide those properties that are required for both bundling or packaging, as well as for unpacking.

The shrinkable thermoplastic films of this invention are shaped from at least two coextruded thermoplastic resins and their direction of tear is substantially perpendicular to their direction of extrusion (machine direction). The packaging according to the invention includes tear initiating means in the form of a tab or pull member oriented in a direction substantially perpendicular to the direction of extrusion of the film to effect film tearing substantially along a straight line.

By the expression "substantially perpendicular" is intended that tearing proceeds in a direction which deviates from the perpendicular by less than 20°. Preferably, this deviation is less than 10°.

By the expression "substantially along a straight line" is intended that tearing proceeds along a line perceived to be straight and which only includes small amplitude waviness along the edge of the tear.

The shrinkable thermoplastic films that tear in the direction substantially perpendicular to the direction of extrusion, providing a tear that is substantially a straight line, is shaped from:

(a) at least one layer of a polyolefin; and
(b) at least one layer of a copolymer selected from among ionic copolymers of:
(1) α-olefins of the formula R—CH=CH$_2$ in which R is hydrogen or an alkyl radical having from 1 to 8 carbon atoms,
(2) α,β-ethylenically unsaturated carboxylic acids having from 3 to 8 carbon atoms, and
(3) optionally, an additional monoethylenically unsaturated comonomer; with the proviso that from 10% to 90% of the carboxylic acid groups of such copolymers are ionized by neutralization by means of metallic ions distributed over the copolymer.

BRIEF DESCRIPTION OF THE DRAWING

The Figure of Drawing is a top plan view of a fragment of the thermoplastic packaging film of the present invention, incorporating two tear-initiating tabs arranged in an H-shape on a reinforced region of said film.

DETAILED DESCRIPTION OF THE PREFERRED EMBODIMENTS OF THE INVENTION

Figure 1:
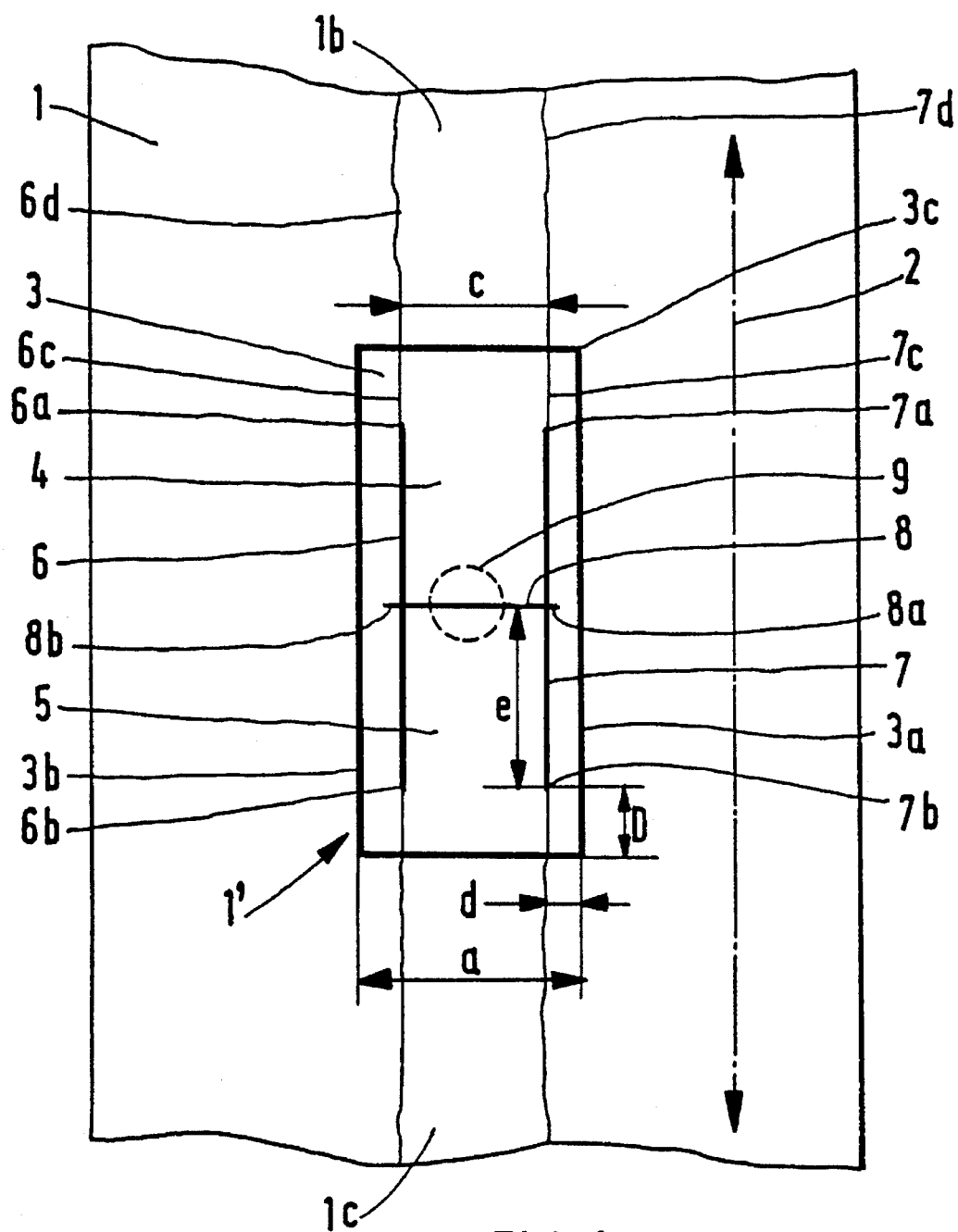

More particularly according to the present invention, the metallic ions generally have an ionized valency of from 1 to 3, inclusive, when the unsaturated acid is a monocarboxylic acid and an ionized valency of 1 when the unsaturated acid is a dicarboxylic acid. The metallic ions can be selected from among complexed and non-complexed metallic ions.

The ionic copolymers that are most advantageously employed are copolymers in which the α-olefin is ethylene and the α, β-ethylenically unsaturated carboxylic acid is a monocarboxylic or dicarboxylic acid and in which the metallic ions are complexed metallic ions, metals of Groups II, III, IV-A and VIII of the Periodic Table, or are ions of a metal of Group I of the Periodic Table and, more particularly, an alkali metal ion.

These ionic copolymers are per se known to this art. They are fully described, as well as a process for the preparation thereof, in U.S. Pat. No. 3,264,272, hereby expressly incorporated by reference.

These copolymers are manufactured and marketed by E. I. du Pont under the trademark Surlyn®, for example. A preferred copolymer is Surlyn® 1601.

By the expression "polyolefin" is intended a homopolymer of an α-olefin or a copolymer of such olefin with one or more comonomers.

The homopolymer that is associated with the ionic copolymer is selected from an α-olefin of formula $R'—CH=CH_2$ in which $R'$ is hydrogen or an alkyl radical having from 1 to 8 carbon atoms.

The α-olefin copolymer is a copolymer of an α-olefin of formula $R'—CH=CH_2$ above, with at least one additional monoethylenically unsaturated, such as aliphatic or aromatic, comonomer. Exemplary such comonomers include vinyl acetate, styrene, and (meth)acrylic compounds. This other monomer can constitute up to 20% by weight of the olefinic copolymer, preferably from 1% to 10% by weight.

From an economic standpoint, the preferred (co)polymers include polymers and copolymers of ethylene and propylene, such as polyethylene, polypropylene, copolymers of ethylene and propylene, ethylene/vinyl acetate copolymers, copolymers of ethylene and acrylic compounds, terpolymers based on olefin, methyl acrylate and ethyl acrylate or even mixtures of straight-chain and branched low density polyolefins. The preferred olefin homopolymer is polyethylene. The preferred copolymer is an ethylene/vinyl acetate (EVA) copolymer.

The total thickness of the shrink film according to the present invention generally ranges from 30 to 300 μm, preferably from 40 to 150 μm. The total thickness of the ionic copolymer, whether it is present in one or more layers is from 5% to 70% and preferably from 15% to 40% of the total film thickness.

The film can be constituted of two layers, the ionic copolymer layer preferably representing about 20% of the thickness thereof.

The film can also constitute three or more layers, the layers of polyolefin and ionic copolymer being arranged in any desired sequence. The particular arrangement has no effect on tearing in the direction substantially perpendicular to the direction of extrusion of the film. When the film has three layers and the two outer layers are of ionic polymer, they each constitute 10% to 30% of the thickness of the film.

The inclusion of an adhesion binder, or adhesive, between the polyolefin layer and the ionic copolymer layer to optionally increase the adhesion between the layers of different polymers is also within the scope of the invention. Such binders/adhesives are per se known and are currently employed in conventional coextrusion processes; usually, such binders are modified ethylene-based copolymers or terpolymers.

The film is shaped by coextruding:
(a) at least one layer of a polyolefin; and
(b) at least one layer of a copolymer selected from among ionic copolymers of:
   (1) α-olefins of formula $R—CH=CH_2$ in which R is hydrogen or an alkyl radical having from 1 to 8 carbon atoms,
   (2) α, β-ethylenically unsaturated carboxylic acids having from 3 to 8 carbon atoms, and
   (3) optionally, an additional monoethylenically unsaturated comonomer; with the proviso that from 10% to 90% of the carboxylic acid groups of such copolymers are ionized by neutralization by means of metallic ions distributed over the copolymer.

The polyolefin and the ionic copolymer are coextruded under conventional polyolefin extrusion conditions. Typically, this is carried out by tubular coextrusion in an annular extruder in which a ball is formed, the material simultaneously being subjected to blowing and longitudinal stretching, thus imparting the shrink properties thereto. Cast coextrusion can also be used, employing a flat die; at the discharge from the die, the film is cooled on a cylinder, the speed of rotation of which is greater than the film discharge rate, whereby the latter is longitudinally oriented. At the outlet of the flat die, it is also possible, via known techniques, to effect flat biaxial stretching.

Preferably, the shaping of the film is by blow coextrusion. The temperature of the screw for the ionic copolymer advantageously ranges from 165° to 220° C., preferably from 170° to 180° C. The temperature of the screw for the polyolefin advantageously ranges from 170° to 220° C., preferably from 175° to 185° C. The temperature of the extrusion die advantageously ranges from 175° to 230° C., preferably from 185° to 195° C. The swelling factor advantageously ranges from 1 to 4, and preferably from 1.5 to 2.5. By "swelling factor" is intended the ratio:

$$\frac{\text{bubble diameter}}{\text{die diameter}}$$

The stretch factor advantageously ranges from 2 to 25, and preferably from 10 to 20. By "stretch factor" is intended the ratio:

$$\frac{\text{bubble stretching speed}}{\text{material discharge speed}}$$

The winding speed advantageously ranges from 7 to 80 m/min, and preferably from 20 to 60 m/min. The extrusion gap advantageously ranges from 0.6 to 2.0 mm, preferably from 1 to 1.4 mm.

This film, in association with the subject tear initiating system, provides the ready-tear packaging of the invention.

The tear-initiating tab is preferably defined by cutting the film along two lines substantially parallel to a direction perpendicular to the direction of extrusion of the film. The tear initiating means preferably comprises two tab members situated end-to-end and formed by cutting the film in a generally H-shape.

The tab or pull member is preferably formed in a reinforced or thickened region of the film by means of a label bonded or welded onto the film. The label is preferably prepared from the same material as the film itself and applied such that the orientations substantially perpendicular to the direction of extrusion of the film and of the label coincide.

The lines along which the film is cut to form the at least one tab are spaced from each other by a distance advantageously ranging from 15 to 40 mm and their length advantageously ranges from 10 to 25 mm and the distance between the parallel lines along which the film is cut and the adjacent outer edge of the reinforced or thickened region of the film is characteristically at least 5 mm, and preferably about 10 mm, the lines terminating at between 10 and 20 mm from the other edges of said reinforced or thickened region.

The total width of the reinforced or thickened region of the film advantageously ranges from 25 to 50 mm, and is preferably from 30 to 50 mm, its total length being a minimum of 40 mm for an H-shaped cutout of the film and 30 mm for a simple tab, its length preferably ranging from 80 to 120 mm.

The accompanying Figure of Drawing illustrates a fragment of a packaging film according to the invention incorporating two tear-initiating tabs arranged in an H-shape on a reinforced region of the film.

The fragment of packaging according to the invention illustrated in the Figure of Drawing is a small portion of a film 1 produced by coextrusion and which has a transverse direction of tearing indicated by the double-headed arrow 2, which is perpendicular to the direction of extrusion. A portion of film 1 is of increased thickness in which cuts in an H-configuration have been made, the portion being preferably formed by bonding a label 3 of a tearable material thereto. A colored paper can be employed for the material constituting said label 3, which permits the location of tabs 4 and 5 formed inside the branches of the H to be clearly identified on the packaged product. It is also possible to use a label, colored or otherwise, of the same material as the film 1, which, in this embodiment, provides a doubling of the thickness of film 1 in the region of the H-shaped cuts, as well as ensuring that the label 3 adheres well and that the overall transparency of the packaging using film 1 is maintained. The increase in thickness is obtained through the use of the same, or a similar, material as that of the film and is oriented such that their directions of extrusion and directions of tearing that are perpendicular thereto, are substantially parallel.

The H-shaped cut-out comprises two straight portions 6 and 7 that are substantially parallel to each other and to the tear direction indicated by arrow 2, joined via a transverse line 8. The lines of cut, 6, 7 and 8 extend simultaneously through the reinforcing label 3 and the film 1, their ends terminating (at 6a, 6b for line 6; 7a, 7b for line 7; and 8a, 8b for transverse line 8, respectively) at a certain minimum distance $\underline{d}$ from the closest lateral edge of the label and at a larger distance $\underline{D}$ from the ends of the label, in the direction of tearing. It should be noted that the ends 8a, 8b of transverse line 8 do not generally exactly coincide at manufacture with the lines 6 and 7.

The width $\underline{a}$ of label 3 advantageously ranges from 25 to 50 mm, and more preferably from 30 to 50 mm, its length (not indicated in the Figure of Drawing) being generally in the range of 80 to 120 mm. The width $\underline{c}$ of tabs 4 and 5 should enable a finger to be inserted into the central region 9, indicated by a circle of dashed lines, of transverse line 8, to lift at least one of the tabs or pulls, such lifting generally being done by the finger. A tab width $\underline{c}$ of 15 to 40 mm, corresponding to the width of a finger, is suitable. The length $\underline{e}$ of the cuts defining the tabs should be sufficient to enable a good grip on the tabs between the fingers, but they should not be of such a length that there is a risk of weakening the packaging. A length of cut $\underline{e}$ of 10 to 25 mm represents a good compromise.

The minimum distance $\underline{d}$ separating the H-shaped lines of cut 6, 7 and 8 defining the tabs from the corresponding longitudinal edge 3a, 3b of label 3 should be at least 5 mm, and the separation $\underline{D}$ in the direction of tear, in other words between the ends 6a, 6b and 7a, 7b of the lines and the edges 3c of the label 3 typically ranges from 10 to 20 mm.

To open a package according to the invention which includes a label 3 on its periphery bearing cut lines 6, 7 and 8, the user inserts a fingernail or an object having a blade, such as a penknife or a screwdriver, into region 9, enabling at least one of tabs 4 and 5 to be lifted. One of the tabs is gripped (e.g., tab 4, but tab 5 can be gripped equally as well) and pulled in the direction of double-headed arrow 2 towards the nearest edge of the label. The continuations, 6c and 7c, of the cut lines 6 and 7 begin to tear and initially offer a slight resistance, but once the edge 3c of the label is reached, the tearing continues along tear lines 6d and 7d without any substantial resistance, permitting a packaged article to be easily unpacked from its packaging film. To accelerate or facilitate unpacking, notably in the case of bulky packaged articles, the film 1 can also be torn by simultaneously or successively stripping off a tear strip 1b by pulling tab 4, and a tear strip 1c by pulling tab 5. If one of the strips 1b or 1c were to break during opening, tearing can continue by carefully pulling the other strip. It should also be noted that the lines of cutting 6 and/or 7 and/or 8 can be lines of perforations or the like, rather than full cuts in order not to reduce the strength of the label region 3 of film 1 too much.

Alternatively, a full cut can be provided on label 3 with a perforated or dashed cut being provided on the underlying film 1, access to the film premarked by dashes being afforded by lifting the tabs 4, 5 of label portion 3 only. The reverse is of course possible, with the film incorporating full cuts and interrupted cuts being provided on the label 3; this provides protection for the tabs 4 and 5 on the film, the use of a knife or similar means being necessary to detach the tabs 4 and 5 on the label 3. It could then be advantageous to provide for the material of the label within circle 9 to be absent such as to thus provide an access zone for lifting the tabs 4, 5 with a blade or the fingernail. The label 3 providing reinforcement or thickening can obviously be of considerably different thickness and strength vis-a-vis those of film 1, notably for the purpose of locally reinforcing the latter in preparation for initiation of tearing.

Very numerous and varied articles such as canned foods can be packaged in the film according to the invention under conventional bundling conditions. By reason of the provision of the simple tear initiator in the form of tabs 4 and 5 cut in the transverse direction during manufacture of the pack, the pack can be opened without exerting any particular force by simply pulling one of the tabs to effect a clean tear. The film always maintains its shrinkability and tear-resisting properties which are essential for its handling, prior to one of the tabs being pulled.

Other than bundling, the films according to the invention can be employed in all packaging applications such as, for example, the manufacture of shrink overwraps for palletizing or bagging goods.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A ready-tear coextrudate, heat-shrinkable thermoplastic film packaging material comprising (a) at least one layer of a polyolefin; and (b) at least one layer of an ionic copolymer which comprises the copolymerizate of (1) an α-olefin of the formula R—CH=CH$_2$ wherein R is hydrogen or an alkyl radical having from 1 to 8 carbon atoms, with (2) an α-β-ethylenically unsaturated carboxylic acid comonomer having from 3 to 8 carbon atoms, with the proviso that from 10% to 90% of the carboxylic acid functions of said copolymer are ionized by neutralization via metallic ions distributed over the copolymer, said packaging material further comprising tear initiating means oriented in a direction substantially perpendicular to the direction of coextrusion of said film, and said tear initiating means comprising at least one tab or pull member provided in a reinforced or thickened region of said film.

2. The thermoplastic film packaging material as defined by claim 1, comprising at least one tab cut in said film along two lines substantially parallel to a direction perpendicular to the direction of coextrusion of said film.

3. The thermoplastic film packaging material as defined by claim 2, said initiating means comprising two tab members arranged end-to-end and cut in said film in a generally H-shape.

4. The thermoplastic film packaging material as defined by claim 3, wherein the lines along which said film is cut to define said at least one tab are spaced from each other by a distance ranging from 15 to 40 mm.

5. The thermoplastic film packaging material as defined by claim 2, wherein the length of the lines along which said film is cut to define said at least one tab ranges from 10 to 25 mm.

6. The thermoplastic film packaging material as defined by claim 1, said reinforced or thickened region of said film comprising a label secured onto said film.

7. The thermoplastic film packaging material as defined by claim 1, said reinforced or thickened region of said film comprising a material similar to that of said film and oriented in a direction substantially parallel to the direction of orientation of said film.

8. The thermoplastic film packaging material as defined by claim 6, said label comprising a material similar to that of said film and oriented in a direction substantially parallel to the direction of orientation of said film.

9. The thermoplastic film packaging material as defined by claim 1, wherein the distance separating the parallel lines along which said film is cut to define at least one tab and the longer outer edges of said reinforced or thickened region of said film is at least 5 mm.

10. The thermoplastic film packaging material as defined by claim 9, said distance being about 10 mm.

11. The thermoplastic film packaging material as defined by claim 4, wherein the parallel lines along which said film is cut to define at least one tab terminate at a distance range from 10 to 20 mm from the shorter outer edges of said reinforced or thickened region of said film.

12. The thermoplastic film packaging material as defined by claim 1, wherein the total width of said reinforced or thickened region of said film ranges from 25 to 50 mm.

13. The thermoplastic film packaging material as defined by claim 1, wherein the length of said reinforced or thickened region of said film is at least 40 mm.

14. The thermoplastic film packaging material as defined by claim 1, wherein the length of said reinforced or thickened region of said film ranges from 80 to 120 mm.

15. The thermoplastic film packaging material as defined by claim 1, wherein said (b) at least one layer of an ionic copolymer which comprises the copolymerizate of (1) an α-olefin of the formula R—CH=CH$_2$, wherein R is hydrogen or an alkyl radical having from 1 to 8 carbon atoms, with (2) an α-β-ethylenically unsaturated carboxylic acid comonomer having from 3 to 8 carbon atoms is the further copolymerizate of (3) at least one other monoethylenically unsaturated comonomer.

16. At least one article packaged within the ready-tear thermoplastic film packaging material as defined by claim 1, said packaging, material being shrunk around said at least one article.

* * * * *